United States Patent [19]

Cheung

[11] Patent Number: 4,906,064

[45] Date of Patent: Mar. 6, 1990

[54] SWITCH FOR SELECTIVELY SWITCHING OPTICAL WAVELENGTHS

[75] Inventor: Kwok-Wai Cheung, Rockaway, N.J.

[73] Assignee: Bell Communications Research, Inc., Livingston, N.J.

[21] Appl. No.: 292,021

[22] Filed: Dec. 30, 1988

[51] Int. Cl.$^4$ .............................................. G02B 6/26
[52] U.S. Cl. ............................. 350/96.15; 350/96.16
[58] Field of Search ............... 350/96.11, 96.12, 96.13, 350/96.14, 96.15, 96.16

[56] References Cited

U.S. PATENT DOCUMENTS

| | | | |
|---|---|---|---|
| 4,690,489 | 9/1987 | Neyer | 350/96.14 |
| 4,708,425 | 11/1987 | Gouali et al. | 350/96.16 |
| 4,775,206 | 10/1988 | Erman et al. | 350/96.13 |

OTHER PUBLICATIONS

"Demonstration of High Capacity In The Lambdanet Architecture: A Multiwavelength Optical Network," H. Kobrinski et al., Electronics Letters, vol. 23, No. 16, pp. 824–826, Jul. 30, 1987.
"Low-Loss Single Polarization Fibers with Asymmetrical Strain Birefringence," T. Hosaka et al., Electronics Letters, vol. 17, No. 15, pp. 530–531, Jul. 23, 1981.
"Tunable Optical Waveguide Directional Coupler Filter," R. C. Alferness et al., Appl. Phys. Lett., vol. 33, No. 2, pp. 161–163, Jul. 15, 1978.
"LiNbO$_3$ Coupled-Waveguide TE/TM Mode Splitter," O. Mikami, Appl. Phys. Lett., vol. 36, No. 7, pp. 491–492, Apr. 1, 1980.
"Tunable Electro-Optic Waveguide TE$\longleftrightarrow$TM converter/Wavelength Filter," R. C. Alferness et al., App. Phys. Lett., vol. 40, No. 10, pp. 861–862, May 15, 1982.
"Acousto-Optic Tunable Filter," S. E. Harris et al., Journal of the Optical Society of America, vol. 59, No. 6, pp. 744–747, Jun. 1969.
"Electronically Tunable Acousto-Optic Filter," S. E. Harris et al, Appl. Phys. Lett., vol. 15, No. 10, pp. 325–326, Nov. 15, 1969.
"CaMoO$_4$ Electronically Tunable Optical Filter," S. E. Harris et al, Appl. Phys. Lett., vol. 17, No. 5, pp. 223–225, Sep. 1, 1970.
"LiNbBO$_3$ TE-TM Mode Converter Using Collinear Acousto-Optic Interaction," Y. Ohmachi et al., IEEE J. Quan, Elect., vol. QE-13, No. 2, pp. 43–46, Feb. 1977.
"Low-Cross-Talk Waveguide Polarization Multiplexer/Demultiplexer for $\lambda = 1.32$ $\mu$m," R. C. Alferness et al., Optic Letters, vol. 10, pp. 140–142, 1984.
"All-Fibre Polarising Beamsplitter," M. S. Yataki et al, Electronics Letters, vol. 21, No. 6, pp. 249–251, Mar. 14, 1985.
"All-Fibre Polarization Splitter/Combiner," T. Bricheno and V. Baker, Electronics Letters, vol. 21, pp. 251–252, 1985.
"Tunable Optical Filter In Fiber-Optic Form," W. P. Risk et al., Optics Letters, vol. 11, No. 9, pp. 578–580, Sep. 1986.
"Use of Highly Elliptical Core Fibers For Two-Mode Fiber Devices," B. Y. Kim et al., Optics Letters, vol. 12, No. 9, pp. 729–731, Sep. 1987.
"Polarization Independent Optical Filter Using Interwaveguide TE$\longleftrightarrow$TM Conversion," R. C. Alferness and L. L. Buhl, Appl. Phys. Lett., vol. 39 No. 2, pp. 131–134, Jul. 15, 1981.

Primary Examiner—Frank Gonzalez
Attorney, Agent, or Firm—James W. Falk

[57] ABSTRACT

A 2×2 optical switching element is described. Illustratively, the switching element includes first and second inputs for receiving optical radiation and first and second outputs for transmitting optical radiation. The switching element also includes mode conversion means for selectively switching optical radiation of a specific wavelength arriving via one of the inputs to either or both ouptus by selectively controlling the conversion of the radiation at the specific wavelength from one mode to another. An N×N switch may be formed from an array of the 2×2 switching element.

16 Claims, 3 Drawing Sheets

SWITCH FOR SELECTIVELY SWITCHING OPTICAL WAVELENGTHS

FIELD OF THE INVENTION

The present invention relates to an optical switch having a plurality of inputs and a plurality of outputs. The switch is operable to route data carried by radiation of a specific wavelength channel from a specific input to a specific output.

BACKGROUND OF THE INVENTION

Optical fibers have an inherently large transmission capacity. Within a spectral interval which is no larger than 100 nm and which is centered at 1.55 μm, the attenuation of an optical fiber is generally less than 0.2 dB/km. This spectral region alone yields more than 13 THz of extremely low loss transmission bandwidth. Other usable spectral regions which have only slightly higher attenuation provide additional transmission capacity.

Although still far from tapping the full transmission potential of optical fibers, recent experiments have demonstrated that very high bit rate transmissions can be achieved in a multi-wavelength optical network. (See for example: Kobrinski et al., "Demonstration of High Capacity in the Lambdanet Architecture: A Multiwavelength Optical Network", Electronics Letters, July 30, 1987, pp. 824–826.) From this perspective, it is reasonable to project numerous wavelengths being used simultaneously in future optical fiber networks. Accordingly, an essential building block of an optical fiber network is a switch which can be used to interconnect a plurality of optical fibers, each of which fibers carries a plurality of wavelengths.

At present most network switching is implemented electronically. Electronic technology is well developed and performs adequately for the present generation of communications networks which are based mainly on metallic cables with a growing share of point-to-point optical fiber trunks. As transmission data rates continue to increase, electronic switching and multiplexing components may become bottlenecks that prevent full utilization of the large bandwidth capacity of optical fibers. The reason is that electronic processing is inherently much slower than the transmission rates of optical fibers.

Although many kinds of optical switch elements have been proposed and investigated—most notably the Ti:LiNbO$_3$ optical wavelength switches and the fiber coupler type mechanical switches—none of these are suitable for future multi-wavelength optical networks and, in particular, none are designed to switch individual wavelengths from specific input fibers to specific output fibers of a switch.

Accordingly, it is an object of the present invention to provide an all-optical switch involving no electronic processing which interconnects a plurality of input fibers and a plurality of output fibers and which can switch specific wavelengths from specific input fibers to specific output fibers. It is a further object of the invention to form such a switch from a matrix of 2×2 switching elements.

SUMMARY OF THE INVENTION

In accordance with the present invention, an all-optical switch for interconnecting a plurality of input optical fibers and a plurality of output optical fibers is formed from a matrix of basic 2×2 cross point switching elements. The number of input fibers, the number of output fibers and the number of independent wavelength channels carried by each fiber is arbitrary.

Each basic switching element has first and second inputs, first and second outputs, a mode combiner, a mode toggle control, and a mode separator. The use of the term mode herein refers to a propagation eigenmode. For example, a single mode fiber has two propagation eigenmodes, i.e. the two orthogonal polarizations of radiation which can propagate therein.

Each of the basic 2×2 switching elements operates as follows. All wavelengths arriving via the first input have a first propagation mode. All wavelengths arriving via the second input have a second propagation mode which is orthogonal to the first propagation mode. Similarly, all wavelengths leaving via the first output have the first propagation mode and all wavelengths leaving via the second output have the second propagation mode.

The mode combiner combines the wavelengths from the two inputs, with the propagation modes being preserved after combination. The combined radiation then passes through the mode toggle control. The wavelengths are then separated according to propagation mode in the mode separator and thus directed to the first or second outputs depending on their propagation mode. If nothing happens in the mode toggle control, the mode separator restores the wavelengths arriving via the first and second inputs to the first and second outputs, respectively.

The mode toggle control can selectively convert the mode of any number of wavelengths passing through it to the orthogonal mode in response to the selective application of a signal. Thus, through the selective application of a signal to the mode toggle control, a wavelength arriving via one of the inputs can be switched to the first or second output depending on whether its mode remains unchanged or is converted to the orthogonal mode. Preferably, the signals applied to the mode toggle control do not convert the mode of any wavelength from one input that would collide with the same wavelength from the other input.

The mode toggle can be used to convert only a fraction of the power at a particular wavelength from one mode to the other. Thus in a 2×2 switching element a particular wavelength can be distributed to either or both outputs. This enables the 2×2 switching element to be used for point-to-point wavelength switching as well as for broadcasting.

Preferably the mode toggle control is implemented as a tunable electro-optic mode converter or as an acousto-optic tunable filter (AOTF). If the mode toggle control is implemented as an AOTF the wavelength selection signals applied thereto are RF signals.

By combining the above-described 2×2 basic switching elements, an all optic N×N switch can be provided. Unlike prior optic switches, the present invention can be utilized to switch a particular wavelength arriving on a particular input fiber to one or more particular output fibers.

DETAILED DESCRIPTION OF THE INVENTION

Figure 1:
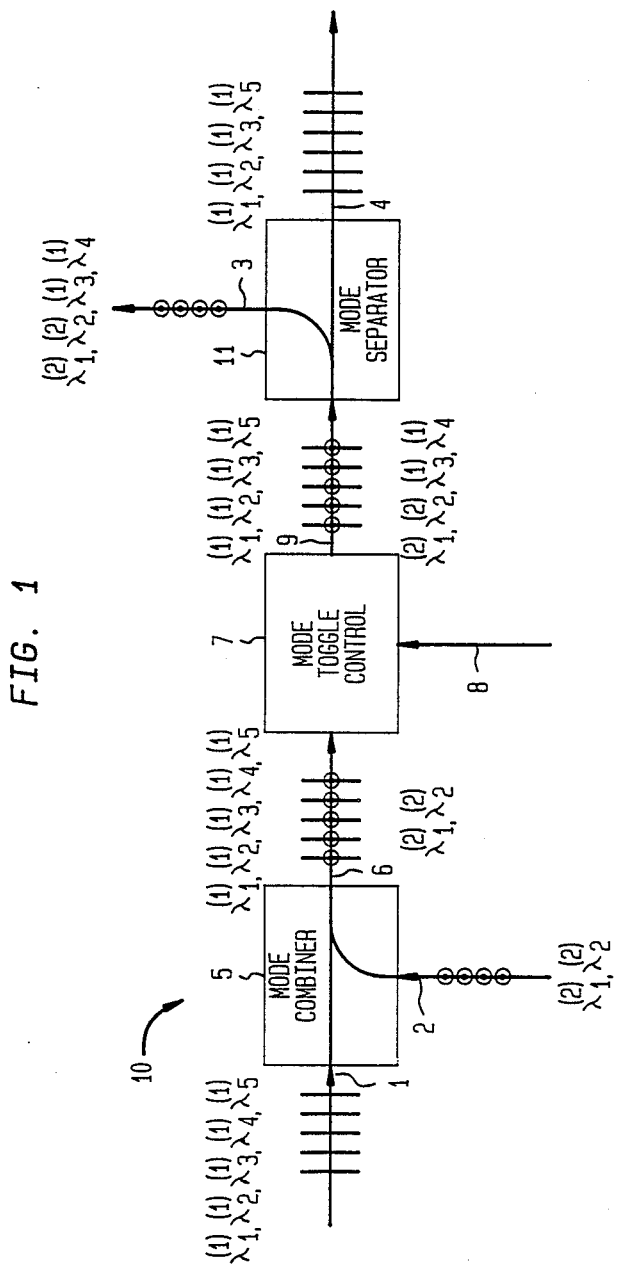
FIG. 1 shows a 2×2 basic optical switching element in accordance with an illustrative embodiment of the present invention.

A 2×2 switching element 10 in accordance with an illustrative embodiment of the present invention is illustrated in FIG. 1. The switching element 10 includes two inputs 1, 2 and two outputs 3, 4. In FIG. 1, and in the following Figures, wavelengths are designed by $\lambda_j^i$ which refers to the $j^{th}$ wavelengths of the $i^{th}$ input.

In addition, in FIG. 1, the two orthogonal propagation modes are taken to be two orthogonal plane polarizations. One propagation mode is represented by lines parallel to the plane of FIG. 1 indicating a mode which is plane polarized in the plane of FIG. 1. The other propagation mode is represented by dots inside circles indicating a mode which is plane polarized perpendicular to the plane of FIG. 1.

Five wavelengths arrive at the switch element 10 via the input 1. These wavelengths are designated $\lambda_1^{(1)}, \lambda_2^{(1)}, \lambda_3^{(1)}, \lambda_4^{(1)}, \lambda_5^{(1)}$. All of the wavelengths arriving via input 1 have the same propagation mode (i.e. polarization parallel to the plane of FIG. 1). Similarly, two wavelengths arrive via input 2. These are $\lambda_1^{(2)}, \lambda_2^{(2)}$. All of the wavelengths arriving via input 2 have the same propagation mode (i.e. polarization perpendicular to the plane of FIG. 1). Thus, the wavelengths arriving via input 1 are polarized perpendicularly to the wavelengths arriving via input 2.

The wavelengths arriving via inputs 1 and 2 are combined using mode combiner 5. The mode combiner 5 preserves polarization so that all the arriving wavelengths are present at the output 6 of the mode combiner 5 with their original polarizations.

The mode toggle control 7 operates as follows. If no signal is applied via line 8, the wavelengths pass right through the mode toggle control 7 without any change in their polarization. However, when an appropriate signal is applied to the mode toggle control 8, any number of the wavelengths can be converted from one plane polarization to the orthogonal plane polarization. The mode toggle control also controls the fraction power at a particular wavelength that may be converted from one polarization to the other. For example, only a fraction (e.g. one-half) of the power at a particular wavelength can be converted to the orthogonal mode. Thus, the basic switching element 10 of FIG. 1 can be used for both point-to-point and broadcast routing.

In FIG. 1, a signal is applied to the mode toggle control 7 via line 8 which converts half the power at wavelength $\lambda_3^{(1)}$ to the orthogonal polarization mode and which converts all of the power at wavelength $\lambda_4^{(1)}$ to the orthogonal polarization mode. Thus, at the output 9 of the mode toggle control, the wavelengths $\lambda_1^{(1)}, \lambda_2^{(1)}, \lambda_3^{(1)}, \lambda_5^{(1)}$ are present in the first propagation mode (i.e. polarized parallel to the plane of FIG. 1) and the wavelengths $\lambda_1^{(2)}, \lambda_2^{(2)}, \lambda_3^{(1)}, \lambda_4^{(1)}$ are present in a second propagation mode (i.e. polarized perpendicualr to the plane of FIG. 1).

The mode separator 11 separates the wavelengths at the output 9 of the mode toggle control 11 according to propagation mode. Thus, the mode separator 11 delivers the wavelengths having the first propagation mode to output 4 and the wavelengths having the second propagation mode to output fiber 3. Note that the switching element 10 has successfully switched wavelength $\lambda_4^{(1)}$ from input 1 to output 3 and has successfully broadcast wavelength $\lambda_3^{(1)}$ from input 1 to outputs 3 and 4.

Figure 2:
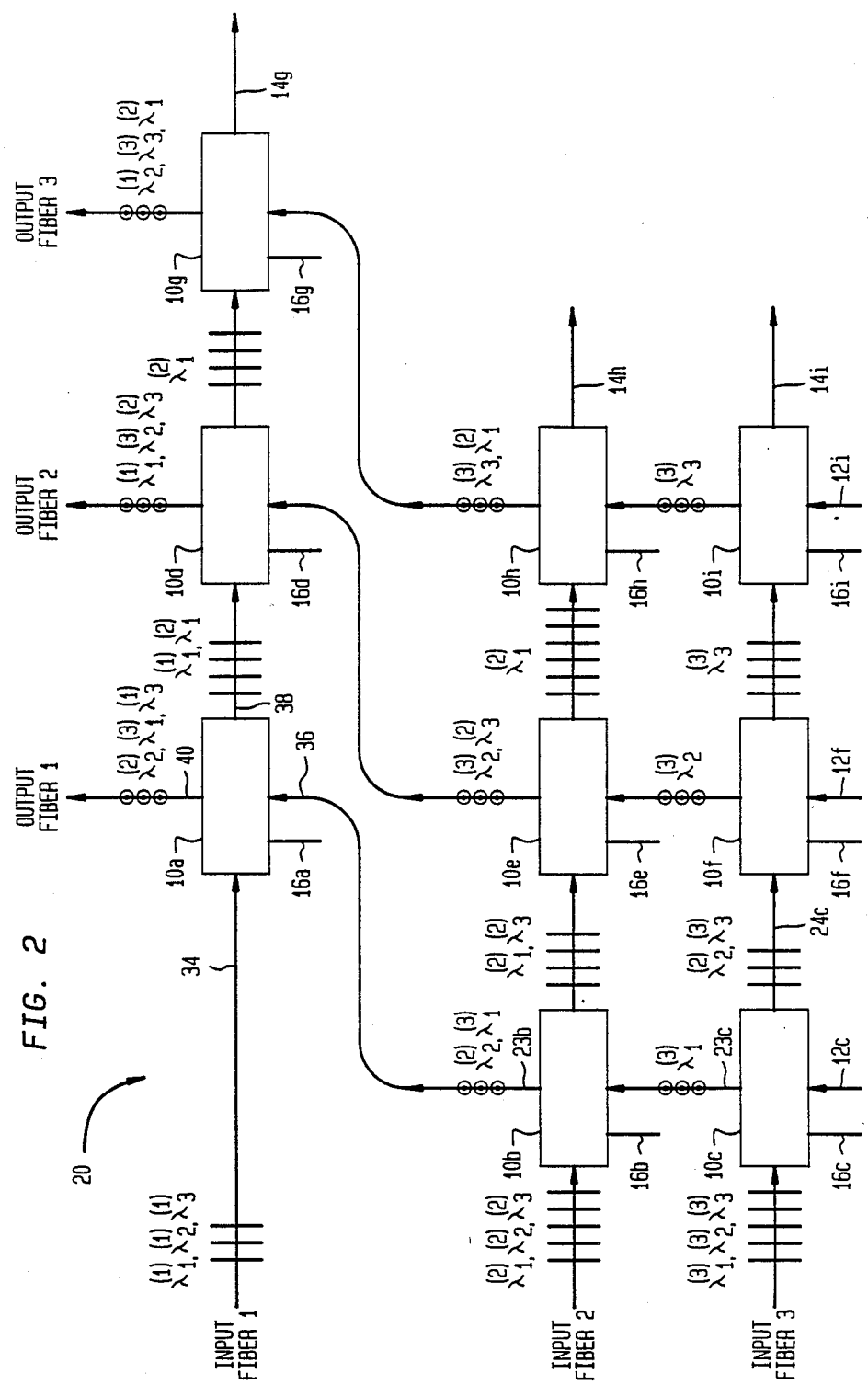
FIG. 2 shows a 3×3 switch formed using the switching elements of FIG. 1, in accordance with an illustrative embodiment of the present invention.

FIG. 2 schematically illustrates a 3×3 switch 20 which is formed as an array of 2×2 switching elements such as the switching element 10 of FIG. 1. There are nine switching elements in the switch 20 which are designated 10a, 10b, 10c, 10d, 10e, 10f, 10g, 10h, 10i. As discussed above, each of the switch elements 10a–10i has two inputs (e.g. 34, 36 of element 10a) and two outputs (e.g. 38, 40 of element 10a). However, in the case of the switch elements 10c, 10f and 10i, one of the inputs is not utilized. These utilized inputs are designated 12c, 12f, 12i. Similarly, in switch elements 10g, 10h, 10i one of the outputs is not utilized. These unused outputs are designated 14g, 14h, 14i. Each of the switch elements 10a ... 10i has a mode toggle control input. The mode toggle control inputs are designated 16a, ... , 16i.

Wavelengths to be switched arrive at the switch 20 of FIG. 2 via three input fibers identified as input fibers 1, 2, and 3. These wavelengths leave the switch 20 via three output fibers identified as output fibers 1, 2 and 3. Input fiber 1 is associated with one of the inputs of switch element 10a, input fiber 2 is associated with one of the inputs of switch element 10b, and input fiber 3 is associated with one of the inputs of switch element 10c. Similarly, output fiber 1 is associated with one of the outputs of switch element 10a, output fiber 2 is associated with one of the outputs of switch element 10d and output fiber 3 is associated with one of the outputs of the switch element 10g.

The wavelengths present on input fiber 1 are $\lambda_1^{(1)}, \lambda_2^{(1)}, \lambda_3^{(1)}$; the wavelengths present on input fiber 2 are $\lambda_1^{(2)}, \lambda_2^{(2)}, \lambda_3^{(2)}$; and the wavelengths present on input fiber 3 are $\lambda_1^{(3)}, \lambda_2^{(3)}, \lambda_3^{(3)}$. It should be noted that of all the wavelengths on each of the input fibers have the same propagation mode or polarization (i.e. polarization parallel to the plane of the FIG. 2).

Specific input wavelengths are routed to specific output fibers by applying appropriate signals to the mode toggle control inputs 16a, ... , 16d of specific ones of the switch elements 10a ... 10i.

Thus, in FIG. 2, wavelengths $\lambda_2^{(2)}, \lambda_1^{(3)}, \lambda_3^{(1)}$ are routed to output fiber 1. Wavelengths $\lambda_1^{(1)}, \lambda_2^{(3)}, \lambda_3^{(2)}$ are routed to output fiber 2 and wavelengths $\lambda_2^{(1)}, \lambda_3^{(3)}, \lambda_1^{(2)}$ are routed to output fiber 3. It should be noted that all of the wavelengths on the output fibers 1,2,3 have the same propagation mode (i.e. polarization prependicular to the plane of FIG. 2).

The paths of some of the wavelengths are considered in more detail. The wavelengths $\lambda_1^{(3)}, \lambda_2^{(3)}, \lambda_3^{(3)}$ arrive at switch element 10c via input fiber 3. A signal is applied to the mode toggle control input 16c of the switch element 10c to convert the polarization of the wavelength $\lambda_1^{(3)}$. The wavelength $\lambda_1^{(3)}$ is now polarized perpendicular to the plane of the FIG. 2 at the output 23c. The polarization of the other two wavelengths $\lambda_2^{(3)}$ and $\lambda_1^{(3)}$ arriving on input fiber 3 remain unchanged. Thus, the wavelengths $\lambda_2^{(3)}, \lambda_1^{(3)}$ are present at the output 24c of the switch element 10c with a polarization parallel to the plane of the FIG. 2. A signal is applied to the mode toggle control input 16b of switch element 10b to change the polarization of input wavelength $\lambda_2^{(2)}$ from parallel to perpendicular. Thus at the output 23b of the switch element 10b, the wavelengths $\lambda_2^{(2)}$ and $\lambda_1^{(3)}$ are present with a perpendicular polarization. Similarly, a signal is applied to the control input 16a of the switch element 10a and convert the polarization of the input wavelength $\lambda_3^{(1)}$ from parallel to perpendicular. Thus, the wavelengths present on output fiber 1 are $\lambda_2^{(2)},\lambda_1^{(3)},\lambda_3^{(1)}$, all with perpendicular polarization.

In this manner (i.e. by applying appropriate signals to the mode toggle control inputs of particular switch elements) specific wavelengths can be switched from specific input fibers to specific output fibers.

There are a variety of possible implementation schemes for the wavelength switching devices illustrated in FIGS. 1 and 2. The implementation schemes include the use of bulk-wave optics devices, integrated optics devices or fiber-optic devices. In these three implementation schemes, the allowable propagation modes are generally restricted to the two polarization modes of a single mode fiber, and the mode toggle control serves to switch wavelengths between the two allowable polarizations. Hence, optical fibers utilized in such systems are preferably polarization preserving fibers (see e.g., T. Hosaka, K. Okamoto, T. Miya, Y. Sasaki and T. Edahiro, "Low-loss Single Polarization Fibers With Asymmetrical Strain Birefringence," Electronics Letters, vol. 17, pp. 530–531, 1981).

An important component for the implementation of the basic 2×2 switch element of FIG. 1 is the mode toggle control. The mode toggle control may be formed using a tunable electro-opti mode converter (see e.g., R. C. Alferness and R. V. Schmidt, "Tunable Optical Waveguide Directional Coupler Filter," Appl. Phys. Lett., vol. 33, pp. 161–163, 1978; O. Mikami,"LiNbO3 Coupled-Waveguide TE/TM Mode Splitter," Appl. Phys. Letter., vol. 36, pp. 491–492, 1980; R. C. Alferness and L. L. Buhl,"Tunable Electro-Optic Waveguide TE⟵⟶TM Converter/Wavelength Filter," Appl. Phys. Lett., vol. 40, pp. 861–862, 1982) or an acousto-optic tunable filter (see e.g.,S. E. Harris and R. W. Wallace,"Acousto-Optic Tunable Filter," J. Opt. Soc. Am., vol. 59, pp. 744–747, 1969; S. E. Harris, S. T. K. Nieh and D. K. Winslow,"Electronically Tunable Acousto-Optic Filter," Appl. Phys. Lett., vol. 15, pp. 325–326, 1969; S. E. Harris, S. T. K. Nieh and R. S. Feigelson,"CaMoO4 Electronically Tunable Acousto-Optical Filter," Appl. Phy. Lett., vol. 17, pp. 223–225, 1970; Y. Ohmachi and J. Noda,"LiNbBO3 TE-TM Mode Converter Using Collinear Acousto-Optic Interaction," IEEE J. Quan. Elect., vol. QE-13, pp. 43–46, 1977.) When the mode toggle control is formed using an acousto-optic tunable filter, the input signals thereto are RF signals.

Figure 3:
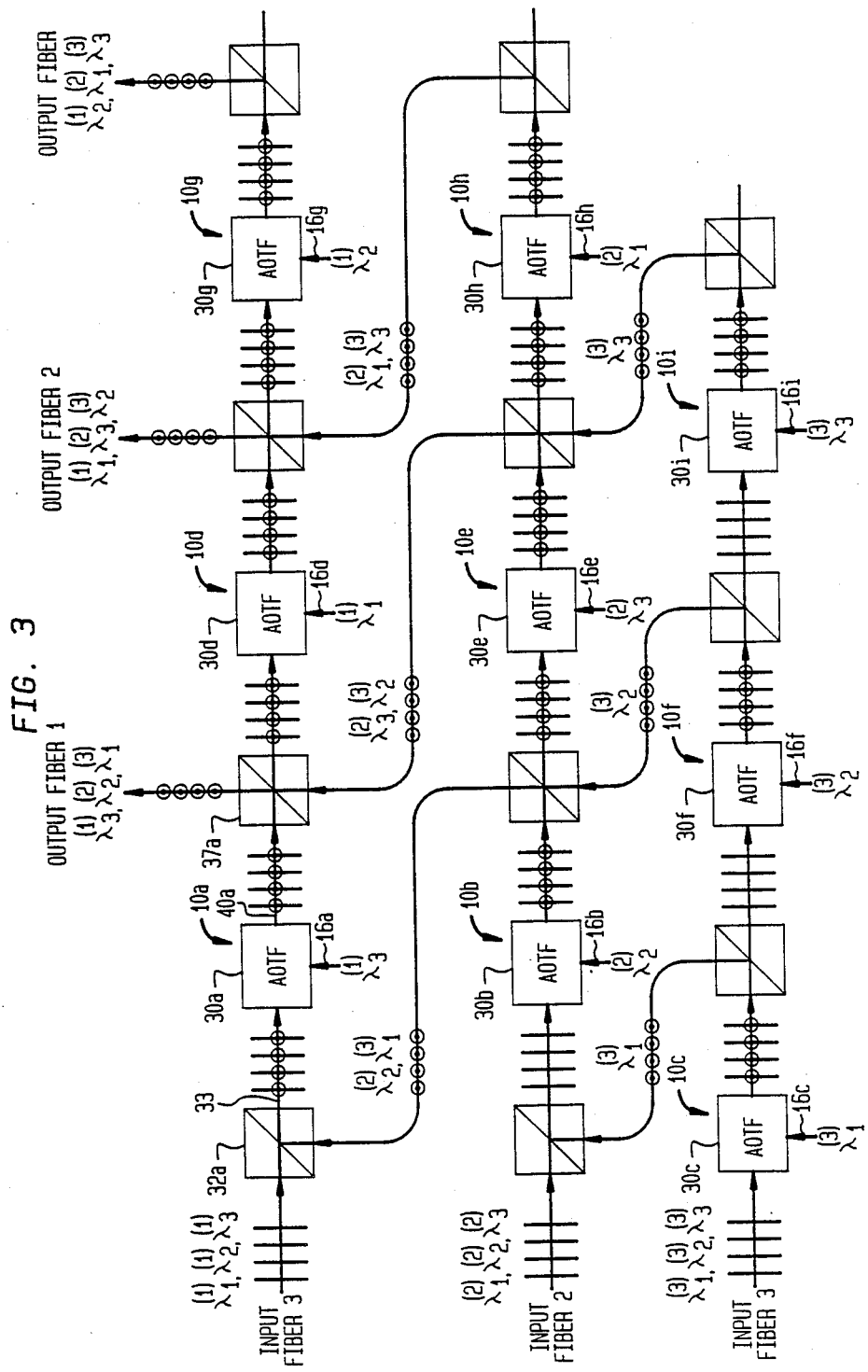
FIG. 3 shows a bulk optics implementation of the switch of FIG. 2.

A bulk optics implementation of the 3×3 switch of FIG. 2 is illustrated in FIG. 3. In FIGS. 2 and 3, like elements are provided with the same identifying designation. In FIG. 3, each of the basic 2×2 switch elements 10a ... 10i comprises a mode toggle control in the form of an acousto-optic filter (AOTF) 30a ... 30i. Depending on the input signals applied to acousto-optic filters 30a ... 30i via the inputs 16a ... 16i, the polarization of one more wavelengths is, for example, converted from perpendicular to parallel. The wavelength selected for mode conversion at each input 16a ... 16i of FIG. 3 is indicted in FIG. 3 adjacent the appropriate input line. Each switch element 10a ... 10i of FIG. 3 also includes devices which provide the mode combining and mode separating functions. These devices may be implemented using polarization preserving beam splitter/combiner type devices. Such devices typically reflect radiation having one polarization while transmitting radiation having the perpendicular polarization. Thus, the switch element 10a of FIG. 3 comprises the polarization preserving, mode combining device 32a. This device transmits the parallel polarized wavelengths $\lambda_1^{(1)},\lambda_2^{(1)},\lambda_3^{(1)}$ and reflects the perpendicularly polarized wavelengths $\lambda_2^{(2)},\lambda_1^{(3)}$. Thus at the output 33 of the device 32a, wavelengths of both polarizations are present.

The device 37a performs the mode separation function for the switch element 10a and the mode combining function for switch element 10d as perpendicularly polarized wavelengths are reflected and parallel polarized wavelengths are transmitted. Thus, the wavelengths transmitted via the output 40a of the AOTF 30a (i.e. wavelengths $\lambda_1^{(1)},\lambda_2^{(1)},\lambda_3^{(1)},\lambda_2^{(2)},\lambda_1^{(3)}$) are separated according to mode by the device 37a and the wavelengths directed to the AOTF 30d (i.e. wavelengths $\lambda_3^{(2)},\lambda_2^{(3)}$ from switch element 10c and $\lambda_1^{(1)},\lambda_2^{(1)}$ from switch element 10a) are combined using the device 37a.

As indicated above, by controlling the RF input signals to the AOTF devices, the amplitude of the polarization conversion can be controlled. By distributing the amplitude of particular wavelengths evenly among a plurality of output fibers, the broadcasting function can be accomplished. By driving an AOTF with two or more RF signals at the same time, the polarization of two or more wavelengths can be converted. Thus, by applying appropriate RF signals to the AOTFs some wavelengths can be broadcast while others can be switched.

To implement the basic switch element using integrated optics, the polarization preserving beam splitter/combiner devices may be formed using a TE-TM mode converter/coupler (see e.g., O. Mikami, LiNbO3 Coupled-Wavelength TE/TM mode Splitter,"Appl. Phys. Lett., vol. 36, pp. 491–492, 1980) or a polarization multiplexer/demultiplexer (see, e.g., R. C. Alferness and L. L. Buhl, "Low-Cross-Talk Waveguide Polarization Multiplexer/Demultiplexer for $\lambda=1.32$ μm," Optics Letters, vol. 10, pp. 140–142, 1984). The mode toggle control may be formed using a tunable TE-TM mode converter.

For a fiber optics implementation, polarization preserving beam splitter/combiner devices may be utilized (see e.g., M. S. Yataki, D. N. Payne and M. P. Varnham, "All-fiber Polarising Beamsplitter," Electronics Letters, vol. 21, pp. 249–251, 1985; T. Bricheno and V. Baker,"All-Fiber Polarization Splitter/combiner," Electronics Letters, vol. 21, pp. 251–252, 1985) as well as AOTF type devices (see. e.g. W. P. Risk, G. S. Kino and B. T. Khuri-Yakub, "Tunable Optical Filter In Fiber-Optic Form," Optics Letters, vol. 11, pp. 578–580, 1986).

Again, it should be noted that polarization rotation is only one possible way to realize the proposed switch for switching individual optical wavelengths. Other propagation mode coupling schemes may be utilized (see e.g. B. Y. Kim, J. N. Blake, S. Y. Huang, and H. J. Shaw, "Use of Highly Elliptical Core FIbers for Two-Mode Fiber Devices," Optics Letters, vol. 12, pp. 729–731, 1987).

In summary, an all optical switch has been described which is capable of switching specific wavelengths from specific input fibers to specific output fibers. The switch is formed from an array of basic 2'12 switching elements. To understand the switching capacity of the inventive switch described herein, consider the following. In an 8×8 switch of the type described herein, each fiber can, for example, carry 16 wavelength multiplexed channels, each of which channels carries 2 Gbits/sec for a total switching capacity of 256 Gbits/sec. In comparison, a 32×32 Batcher-banyan electronic packet switch can switch 3.2 Gbits/sec assuming each input channel has an information rate of 100 Mbits/sec.

Finally, the above-described embodiments of the invention are intended to be illustrative only. Numerous alternative embodiments may be devised without departing from the spirit and scope of the present invention.

What is claimed is:

1. An optical switching element comprising
    a first input for receiving optical radiation comprising a first plurality of optical wavelengths all having a first propagation mode,
    a second input for receiving optical radiation comprising a second plurality of wavelengths all having a second propagation mode,
    means for combining said wavelengths of said first and second pluralities while preserving said propagation modes,
    means in communication with an output of said combining means for converting one or more of said wavelengths from one of said modes to the other of said modes in response to a signal applied thereto, and
    means in communication with an output of said converting means for separating said wavelengths according to propagation mode.

2. The switch element of claim 1 wherein said first and second propagation modes are first and second orthogonal plane polarizations respectively.

3. The switch element of claim 1 wherein said converting means is an acousto-optic tunable filter.

4. The switch element of claim 1 wherein said converting means is a tunable electro-optic mode converter.

5. The switch element of claim 1 wherein said mode combining means utilizes a device which reflects radiation having one of said propagation modes and transmits radiation having the other of said propagation modes.

6. The switch element of claim 1 wherein said mode separating means utilizes a device which reflects radiation having one of said propagation modes and which transmits radiation having the other of said propagation modes.

7. The switch element of claim 1 wherein said conversion means converts all or a fraction of the radiation at a particular wavelength from one of said propagation modes to the other of said propagation modes.

8. A 2×2 optical switching element comprising
    first and second inputs for receiving optical radiation,
    first and second outputs for transmitting optical radiation, and
    mode conversion means for selectively switching optical radiation of a specific wavelength arriving via one of said inputs to either or both of said outputs by selectively controlling the conversion of said radiation at said specific wavelength from one propagation mode to another.

9. An N×N optical switch comprising N inputs and N outputs, said switch being capable of switching optical radiation at a specific wavelength from a specific one of said N inputs to one or more specific ones of said N outputs, said switch being formed from an array of 2×2 switching elements, each of said 2×2 switching elements comprising two inputs, two outputs and means for switching radiation at a specific wavelength arriving via one of said two inputs to either or both of said two outputs in response to a signal applied thereto.

10. The switch of claim 9 wherein each of said 2×2 switching elements includes means for converting optical radiation from a first propagation mode to a second propagation mode.

11. An optical switching element comprising
    mode combining means for combining first optical wavelengths of a first propagation mode at a first input with second optical wavelengths of a second propagation mode orthogonal to said first mode at a second input,
    mode toggle control means connected to said mode combining means for determining the propagation modes of said first and second optical wavelengths, and
    mode separator means connected to said mode toggle control means for separating said first and second wavelengths to first and second outputs dependent upon the propagation mode of said first and second wavelengths as determined by said mode toggle control means.

12. An optical switching element in accordance with claim 11 wherein said mode toggle control means comprises means for determining that all of the power of each of said first and said second wavelengths is in one of the two orthogonal propagation modes or is split between said two orthogonal propagation modes.

13. An optical switching element in accordance with claim 11 wherein said mode toggle control means is an acousto-optical tunable filter responsive to different frequency signals.

14. An optical switching element in accordance with claim 11 wherein said mode separator control means further comprises a mode combining means for a subsequent optical switching element.

15. A method of switching optical signals appearing on two input leads to one of two output leads and wherein said signals on said input leads are of orthogonal propagation modes comprising the steps of combining said optical signals with their original propagation modes, individually determining that each of said optical signals shall retain its original propagation mode or be changed to the orthogonal propagation mode, and
    separating said optical signals with said thus determined propagation modes to one or the other of said output leads.

16. A method of switching optical signals in accordance with claim 15 wherein said determining step determines whether all or part of the optical signal power or particular signals shall have their propagation modes changed.

* * * * *

UNITED STATES PATENT AND TRADEMARK OFFICE
CERTIFICATE OF CORRECTION

PATENT NO. : 4,906,064
DATED : March 6, 1990
INVENTOR(S) : Kwok-Wai Cheung

It is certified that error appears in the above-indentified patent and that said Letters Patent is hereby corrected as shown below:

Title Page:
In the abstract, line 8, "ouptus" should read --outputs--.
Column 1, line 50, "wavelength" should read --waveguide--.
Column 5, line 29, "electro-opti" should read --electro-optic--.
Column 6, line 19, "10c" should read --10e--;
    line 67, "2'12" should read --2×2--.
Column 8, line 61, "or" should read --of--.

Signed and Sealed this

Twenty-sixth Day of April, 1994

Attest:

BRUCE LEHMAN

Attesting Officer

Commissioner of Patents and Trademarks